April 25, 1933. T. A. FAGAN 1,905,625
CONSERVATION VALVE
Filed July 31, 1930 2 Sheets-Sheet 1
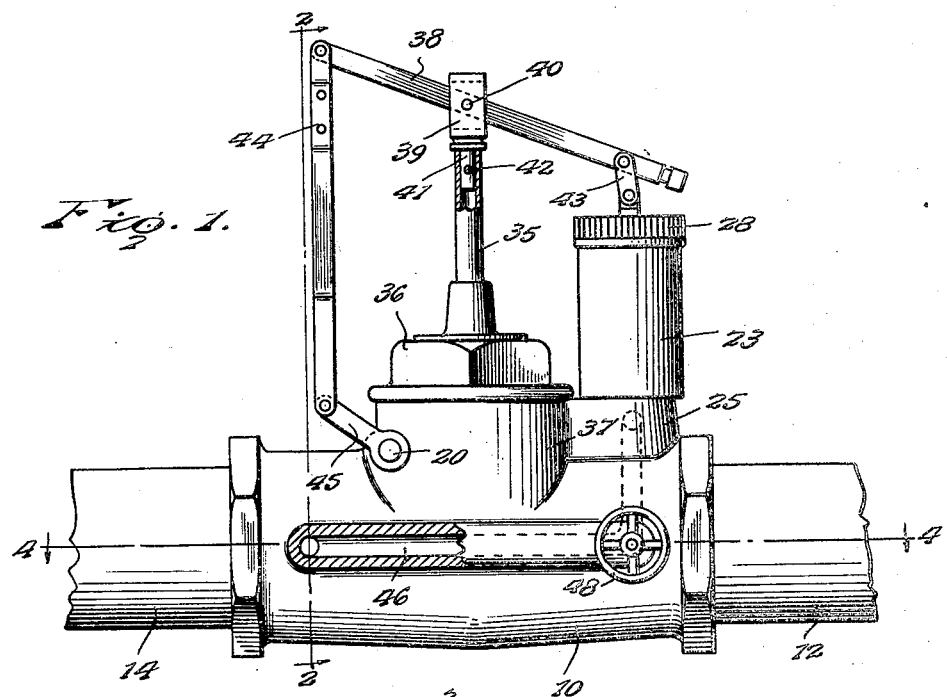
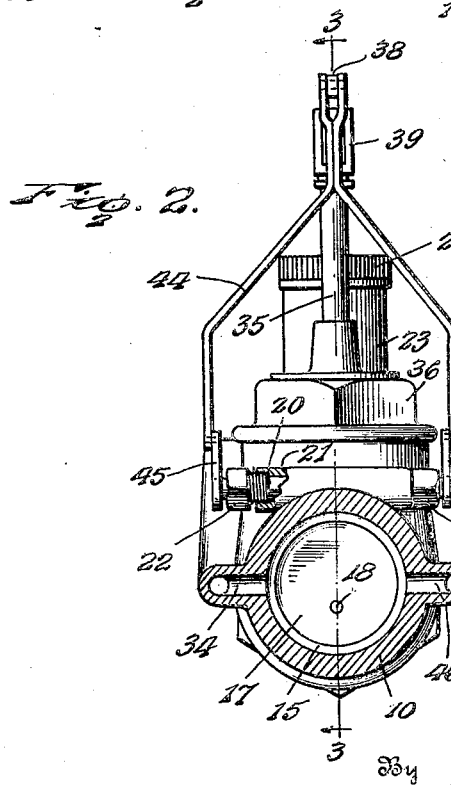
Inventor
T. A. Fagan.
By Lacey & Lacey,
Attorneys April 25, 1933.   T. A. FAGAN   1,905,625
CONSERVATION VALVE
Filed July 31, 1930   2 Sheets-Sheet 2
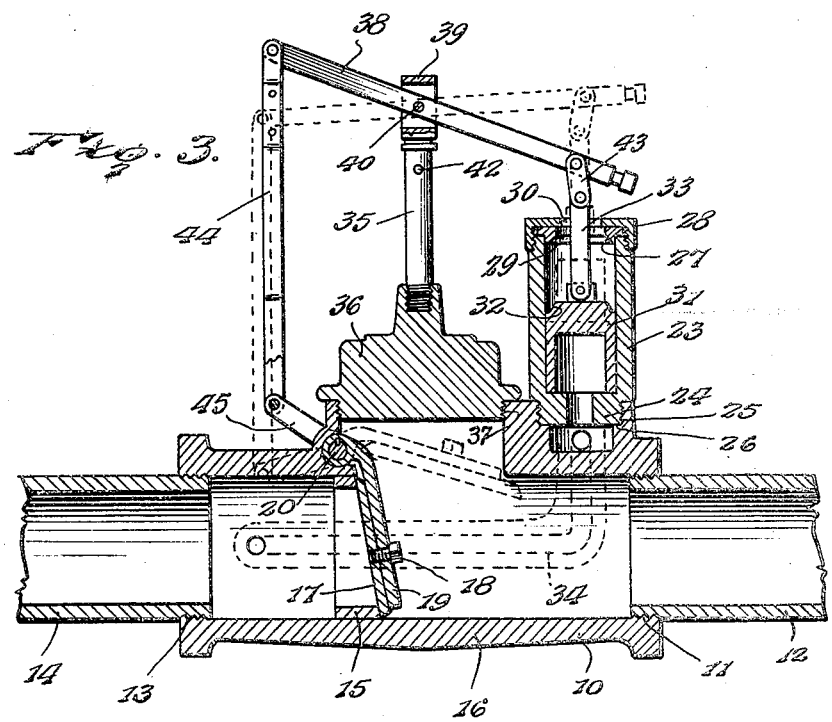
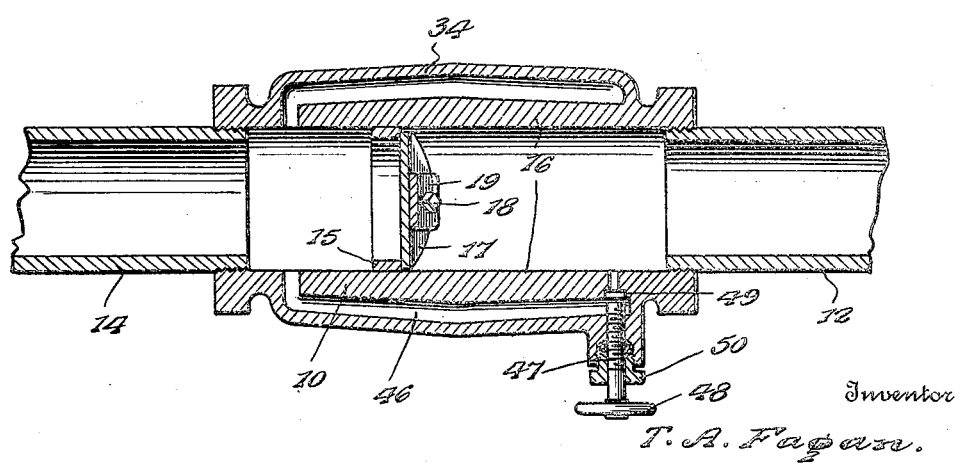

Patented Apr. 25, 1933

1,905,625

UNITED STATES PATENT OFFICE

THOMAS A. FAGAN, OF DENVER, COLORADO

CONSERVATION VALVE

Application filed July 31, 1930. Serial No. 472,041.

This invention relates to conservation valves and has for an object to provide a valve which may be used on pipe lines that carry gas, steam, water, oil or air under any degree of pressure, and which will automatically shut off the flow of fluid to the pipe in case of emergency, such as where a break occurs in the pipe or system of piping connected thereto, at a point beyond said valve.

A further object of the invention is to provide a conservation valve which will be entirely automatic in operation, and will require no attention, and will include a manually operable valve and by-pass to equalize the pressure on opposite sides of the swing valve in the pipe so as to move the controlling piston to open the valve after a break has been repaired.

A further object of the invention is to provide an extremely simple device in which the swing valve in the pipe and the controlling piston will be operatively connected by a novel walking beam structure which connects the piston and swing valve for movement as a unit, thus dispensing with weights and other operating devices which in practice are liable to cause trouble.

A further object of the invention is to provide the walking beam structure of the valve with an adjustable supporting post which permits of the piston being accurately seated in the top of its cylinder in an annular seat whereby leakage past the piston is prevented.

A still further object of the invention is to provide a conservation valve which will be formed of a few strong and durable parts which are inexpensive to manufacture and which will not easily get out of order.

With the above and other objects in view the invention consists in certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification:

Figure 1 is a side elevation of my improved conservation valve,

Fig. 2 is a cross sectional view taken on the line 2—2 of Figure 1,

Fig. 3 is a longitudinal sectional view taken on the line 3—3 of Fig. 2, and

Fig. 4 is a longitudinal sectional view taken on the line 4—4 of Figure 1.

Referring now to the accompanying drawings in which like characters of reference designate similar parts in the various views, 10 designates the valve housing having a threaded inlet 11 to receive an inlet pipe 12 and having a threaded outlet 13 to receive an outlet pipe 14. The housing is provided with a removable annular seat 15 which is machined to present a true surface and which is disposed at an oblique angle to the axis of the housing. The seat may be threaded into the housing or pressed thereinto as desired. The inlet and the outlet of the housing may be threaded or flanged according to the size of pipe to which the device is to be applied.

A flat gate or swing valve 17 is fixed by means of a screw 18 to a swinging arm 19 which is carried by a shaft 20. The shaft is journaled in a transverse bearing 21 carried by the housing, as best shown in Fig. 2, and the ends of the shaft extend exteriorly of the housing. Gland nuts 22 are preferably mounted on the ends of the shaft and are threaded into the ends of the bearing so as to prevent leakage of fluid or gas past the shaft. The swing valve 17 is of sufficient diameter to seat snugly on the annular seat 15 and when closed assumes an oblique position with respect to the longitudinal axis of the housing, as best shown in Fig. 1. The valve may be removed either through the inlet or through the top of the housing.

A cylinder 23 is provided with a reduced tubular neck 24 which is screwed into an interiorly threaded socket 25 formed in the valve housing. The bore of the socket is reduced to provide a stop shoulder 26 against which the neck of the cylinder bears, as best shown in Fig. 3. The top of the cylinder is open. An annular seat 27 is disposed in the top of the cylinder and is held firmly in place by a cap 28 which is threaded onto the top of the cylinder. Both the seat and the cap are provided with axial openings 29 and 30 which vent the cylinder to the atmosphere.

Disposed within the cylinder 23 is a piston 31, the same being provided in the head thereof with a beveled surface 32 which is adapted to seat snugly against a corresponding beveled surface on the annular seat 27 in the top of the cylinder and prevent leakage of gas or fluid past the piston. The piston is provided with a piston rod 33 which projects upwardly through the registering openings 29 and 30 in the annular seat and cap of the piston cylinder.

Referring now to Figs. 3 and 4, it will be seen that a by-pass 34 is disposed longitudinally of the valve housing, one end of the by-pass opening into the housing near the outlet end thereof and the opposite end of the by-pass extending upwardly along the inlet end of the valve housing and opening into the bore of the above mentioned socket 25. When the swing valve 17 is open, as shown in dotted lines in Fig. 3, it being assumed that pressure on both sides of the valve is equalized, the pressure against the piston 31 will be the same as in the pipe line and valve housing whereby the piston is held seated snugly in the top of the cylinder.

A walking beam structure is provided to operatively connect the swing valve 17 and piston 31 to move as a unit. The walking beam structure comprises a supporting post 35 which is threaded at one end into a flanged nut 36, as best shown in Figs. 1 and 3, said nut being threaded into an opening 37 formed in the valve housing.

The beam lever 38 is pivoted intermediate the ends to a fulcrum block 39 by means of a pivot pin 40. The fulcrum block is provided with a stem 41 which enters the bore of the tubular post 35 and is removably secured to the post by means of a pin 42.

One end of the beam lever 38 is pivotally connected to the piston rod 33 by means of a link 43 so that movement of the lever will be communicated to the piston without binding of the parts. The opposite end of the beam lever 38 is connected by means of a forked link 44 to the above mentioned shaft 20, the branches of the fork being pivotally connected to short lever arms 45 which are rigidly secured to the projecting ends of said shaft 20.

It will be here observed that by rotating the threaded post 35 and nut 36 relatively to each other the height of the post 35 may be varied for adjusting the piston to accurately seat in the annular seat 27.

By again referring to Fig. 4, it will be seen that the valve housing 10 is provided with a by-pass 46 which is disposed parallel with the by-pass 34 and on the opposite side of the housing therefrom. One end of the by-pass 46 opens into the outlet end of the housing and the opposite end of the by-pass opens into the inlet end of the housing. This by-pass is for the purpose of equalizing the pressure on opposite sides of the swing valve after a break has been repaired to permit of the piston 31 being moved upwardly to open the swing valve. A valve 47 is provided with a hand wheel 48 and is screwed into the by-pass against a seat 49 to normally close the by-pass. A gland nut 50 is carried by the valve and threaded into the wall of the by-pass to prevent leakage of gas or fluid past the valve.

In operation, when the system is charged and in its normal condition, the swing valve 17 stands in its opened position, as indicated by dotted lines in Fig. 3. The fluid or gas under pressure on the outlet side of the valve housing passes through the by-pass 34 and into the cylinder 23 where it acts on the piston 31 to hold the walking beam structure in position to maintain the swing valve open.

If a break should occur in the outlet pipe 14 or its connections, or if for any other reason the pressure in the outlet pipe at the point where the pipe is attached diminishes to such a degree that, acting in the cylinder 23 on the piston 31, it is insufficient to overcome the weight of the swing valve 17 which, as shown in Fig. 3, is normally held in inclined position, the piston descends. The walking beam structure thereupon starts to close the valve 17 and pressure on the inlet side of the valve completes the closing movement to seat the valve on the valve seat 15 in the housing. Further discharge of the fluid or gas, which may be both wasteful and dangerous, is thereby stopped.

When the device has been automatically closed and it is desired to open the swing valve 17 to its normal position, the valve 47 is manually opened. Thereupon, the fluid from the inlet side of the swing valve will flow through the by-pass 46 to the other side of the valve where it will again build up the pressure, and as soon as this pressure acting on the piston 31 is sufficient to overcome the weight of the swing valve, the swing valve is automatically opened. The manually operated valve 47 in the by-pass may then be closed.

Having thus described the invention, I claim:

The combination with a valve housing, a swing valve pivoted at the top therein and closing in the direction of flow, a crank for operating the valve, a by-pass conduit in the housing laterally of the valve and a piston operated by pressure in the by-pass, of a cap closing a hand opening formed in the housing above the valve, a post adjustable at the bottom on said cap, a walking beam carried by the top of the post, a link connecting one end of the walking beam with said crank, a pair of links pivotally connected together and connecting the other end of said walking beam with said piston, a cylinder for the piston, and an annular seat adjustably mounted in the end of the cylinder, the piston and the seat being tapered to provide tight seating of the piston for sealing the by-pass when said vave is open, adjustment of said post and of said seat relative to each other permitting said piston accurately seating in said seat whereby leakage past the piston when said valve is open is positively prevented.

In testimony whereof I affix my signature.

THOMAS A. FAGAN. [L. S.]